(12) United States Patent
ten Dam

(10) Patent No.: US 11,564,396 B2
(45) Date of Patent: Jan. 31, 2023

(54) OVEN WITH IMPROVED AIRFLOW

(71) Applicant: B/E Aerospace, Inc., Winston Salem, NC (US)

(72) Inventor: Martijn ten Dam, Amsterdam (NL)

(73) Assignee: B/E Aerospace, Inc., Winston-Salem, NC (US)

( * ) Notice: Subject to any disclaimer, the term of this patent is extended or adjusted under 35 U.S.C. 154(b) by 831 days.

(21) Appl. No.: 16/298,333

(22) Filed: Mar. 11, 2019

(65) Prior Publication Data

US 2020/0288725 A1    Sep. 17, 2020

(51) Int. Cl.
| | | |
|---|---|---|
| *A21B 1/26* | (2006.01) | |
| *A21B 3/15* | (2006.01) | |
| *F24C 15/32* | (2006.01) | |
| *F24C 15/30* | (2006.01) | |

(52) U.S. Cl.
CPC .................. *A21B 1/26* (2013.01); *A21B 3/15* (2013.01); *F24C 15/322* (2013.01); *F24C 15/30* (2013.01)

(58) Field of Classification Search
CPC . A21B 1/26; A21B 3/15; F24C 15/322; F24C 15/30
See application file for complete search history.

(56) References Cited

U.S. PATENT DOCUMENTS

| | | | | |
|---|---|---|---|---|
| 3,905,760 | A * | 9/1975 | Johansson | A21B 1/26 432/176 |
| 5,228,385 | A * | 7/1993 | Friedrich | A21B 1/26 99/352 |
| 8,063,342 | B2 * | 11/2011 | Hines, Jr. | F24C 15/325 219/400 |
| 2012/0211482 | A1 * | 8/2012 | Hertzberg | F24C 15/322 219/400 |
| 2018/0249718 | A1 | 9/2018 | Nelson et al. | |
| 2019/0309955 | A1 * | 10/2019 | Castillo | A23L 5/13 |

FOREIGN PATENT DOCUMENTS

| | | |
|---|---|---|
| DE | 3508747 A1 | 9/1985 |
| EP | 0218595 A1 | 4/1987 |
| EP | 0401173 A2 | 12/1990 |
| EP | 2236942 A1 | 10/2010 |
| JP | S57155039 A | 9/1982 |
| WO | 2012062875 A1 | 5/2012 |

OTHER PUBLICATIONS

Extended EP Search Report dated Jun. 9, 2020 for EP Application No. 19216056.

* cited by examiner

*Primary Examiner* — Alfred Basichas
(74) *Attorney, Agent, or Firm* — Suiter Swantz pc llo

(57) ABSTRACT

An oven may include inner oven walls defining a cavity. The oven may further include a heating element configured to heat air in the oven. The oven may further include a fan positioned between the rear of the oven and the heating element. The fan may be configured to: draw air from the front of the oven to the rear of the oven; blow the drawn air over the heating element to produce heated air; and distribute the heated air within the oven.

12 Claims, 16 Drawing Sheets

OVEN WITH IMPROVED AIRFLOW

BACKGROUND

In existing ovens, hot air is pushed along a meal carrier and inner oven walls all the way to the front of the oven and then sucked back through the meal carrier back to the heating element. As a result, the hot air loses energy to the inner oven walls and oven door before reaching the meals in the meal carrier, and the airflow within the oven is not distributed evenly through the meal carrier.

SUMMARY

In one aspect, embodiments of the inventive concepts disclosed herein are directed to an oven. The oven may include inner oven walls defining a cavity within the oven, wherein the oven has a front and a rear. The oven may further include a meal carrier positioned within the cavity of the oven. The meal carrier may have a front and a rear corresponding to the front and the rear of the oven, respectively. The meal carrier may include a top wall, two side walls, and a bottom wall. The front and the rear of the meal carrier may be open to allow a flow of air through the meal carrier from the rear of the oven to the front of the oven. The meal carrier may include meal trays positioned generally parallel to the top wall and the bottom wall of the meal carrier. The oven may further include a heating element configured to heat air in the oven. The heating element may be positioned between the meal carrier and the rear of the oven. The oven may further include a fan positioned between the rear of the oven and the heating element. The fan may be configured to: draw air from the front of the oven between the meal carrier and the inner oven walls to the rear of the oven; blow the drawn air over the heating element to produce heated air; and distribute the heated air through the meal carrier between meal trays.

In a further aspect, embodiments of the inventive concepts disclosed herein are directed to a system including an oven. The oven may include inner oven walls defining a cavity within the oven, wherein the oven has a front and a rear. The oven may further include a heating element configured to heat air in the oven. The oven may further include a fan positioned between the rear of the oven and the heating element. The fan may be configured to: draw air from the front of the oven to the rear of the oven; blow the drawn air over the heating element to produce heated air; and distribute the heated air within the oven.

In a further aspect, embodiments of the inventive concepts disclosed herein are directed to an aircraft galley including an oven insert. The oven insert may include inner oven walls defining a cavity within the oven insert, wherein the oven insert has a front and a rear. The oven insert may further include a meal carrier positioned within the cavity of the oven insert. The meal carrier may have a front and a rear corresponding to the front and the rear of the oven insert, respectively. The meal carrier may include a top wall, two side walls, and a bottom wall. The front and the rear of the meal carrier may be open to allow a flow of air through the meal carrier from the rear of the oven insert to the front of the oven insert. The meal carrier may include meal trays positioned generally parallel to the top wall and the bottom wall of the meal carrier. The oven insert may further include a heating element configured to heat air in the oven insert. The heating element may be positioned between the meal carrier and the rear of the oven insert. The oven insert may further include a fan positioned between the rear of the oven insert and the heating element. The fan may be configured to: draw air from the front of the oven insert between the meal carrier and the inner oven walls to the rear of the oven insert; blow the drawn air over the heating element to produce heated air; and distribute the heated air through the meal carrier between meal trays.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
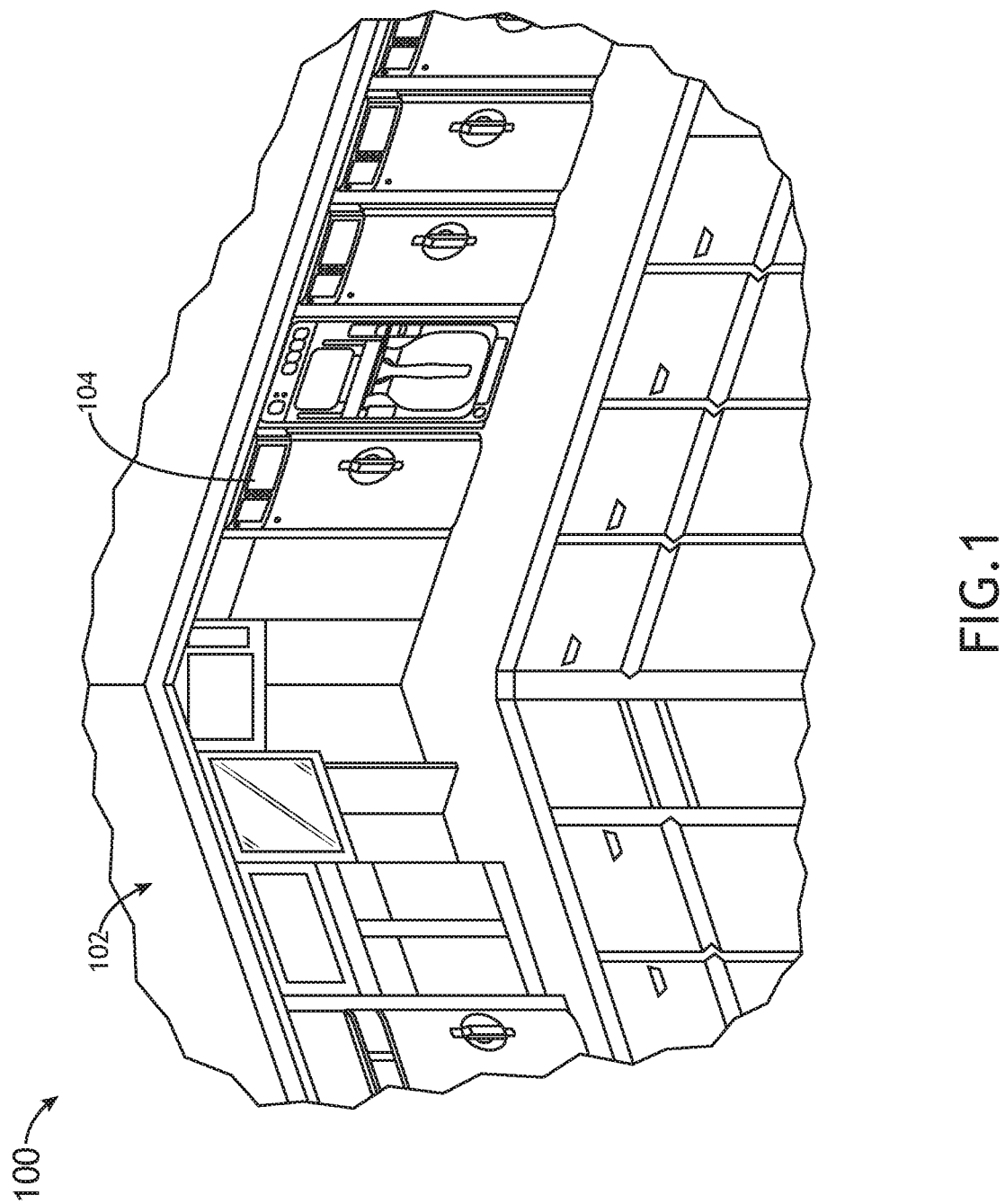
FIG. 1 is a perspective view of an exemplary embodiment of a system including an aircraft galley including an oven insert according to the inventive concepts disclosed herein.
Figure 2:
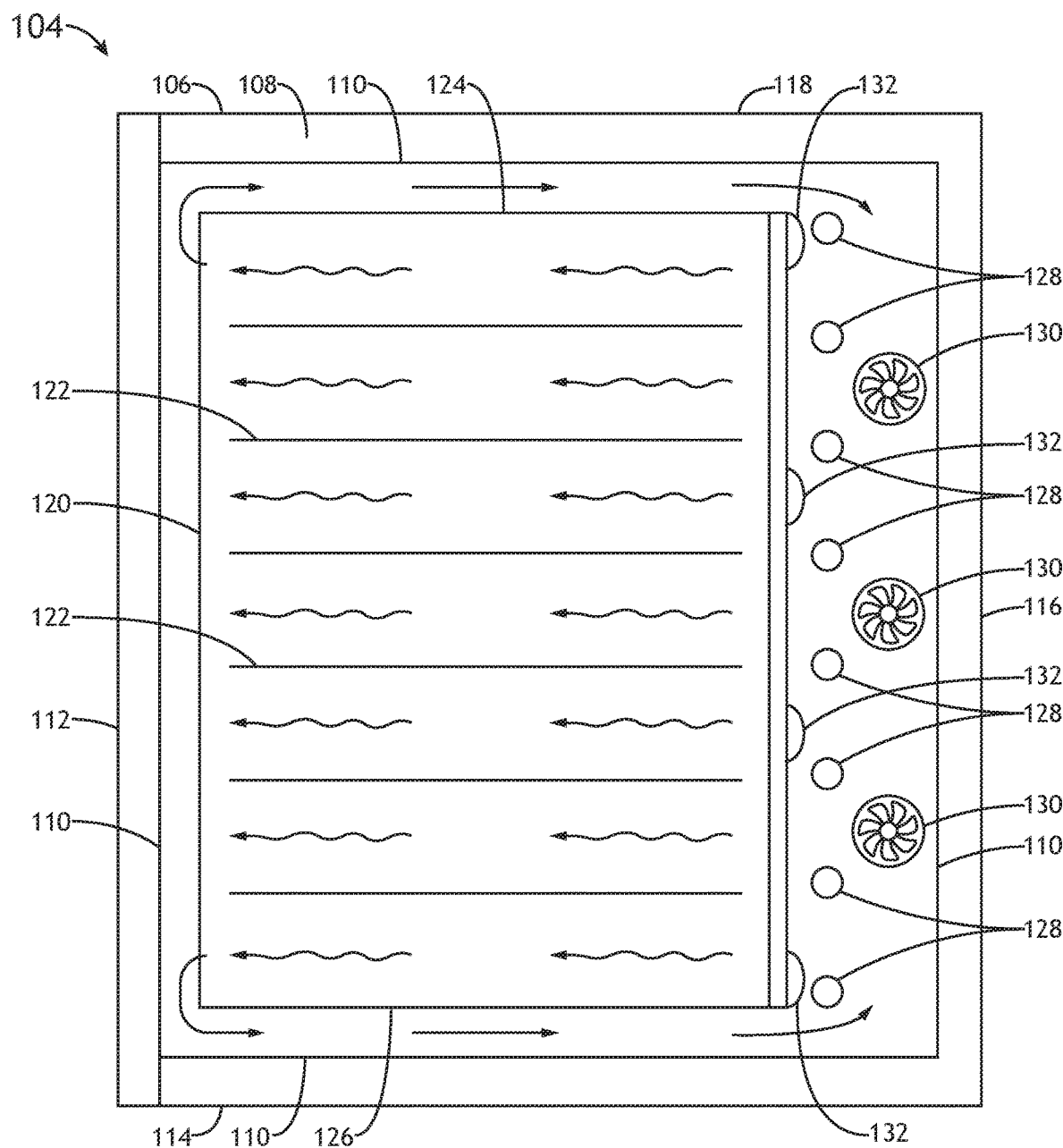
FIG. 2 is a side cross-sectional view of an exemplary oven of FIG. 1 according to the inventive concepts disclosed herein.
Figure 3:
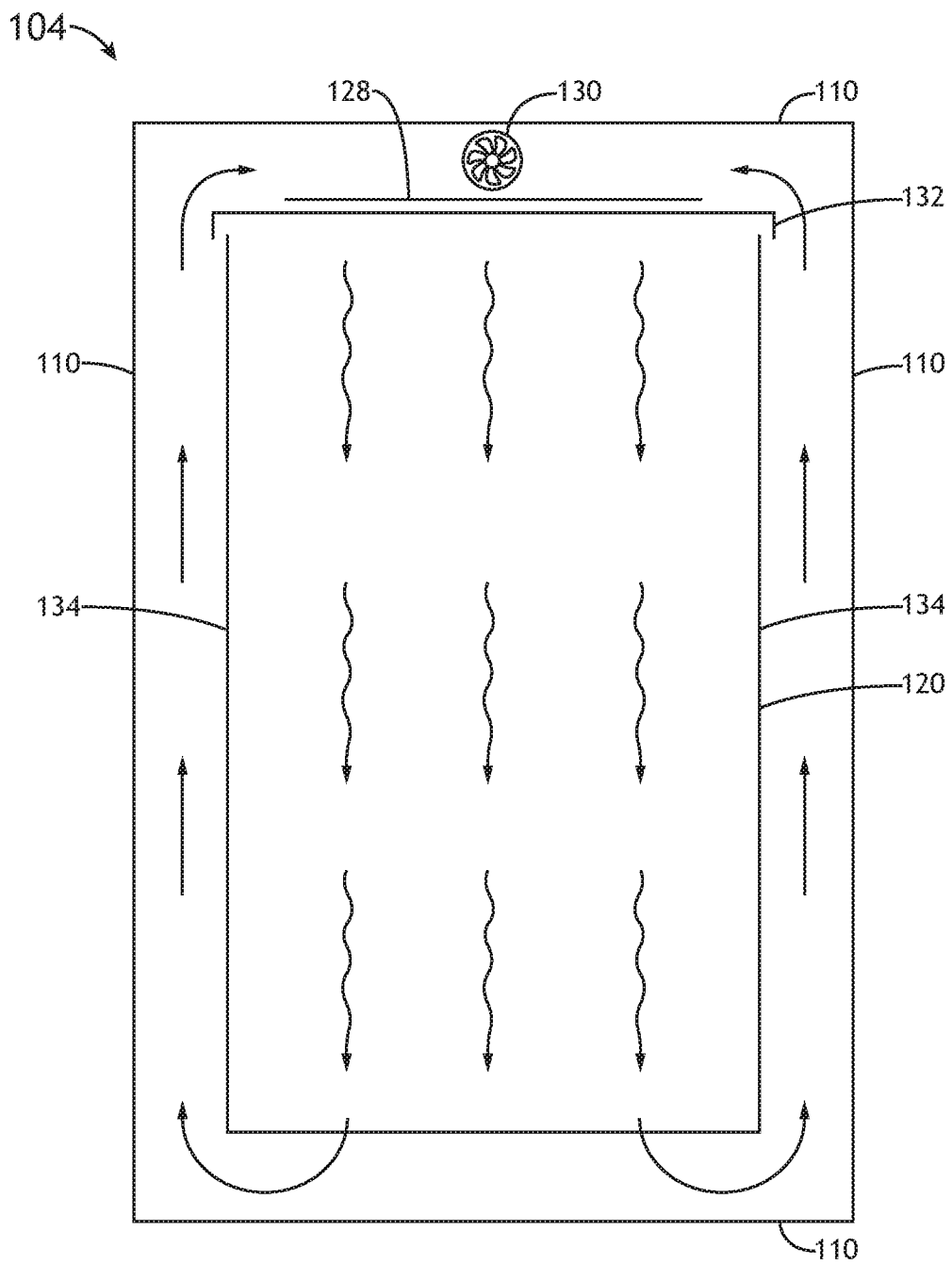
FIG. 3 is a top cross-sectional view of an exemplary oven of FIG. 1 according to the inventive concepts disclosed herein.
Figure 4:
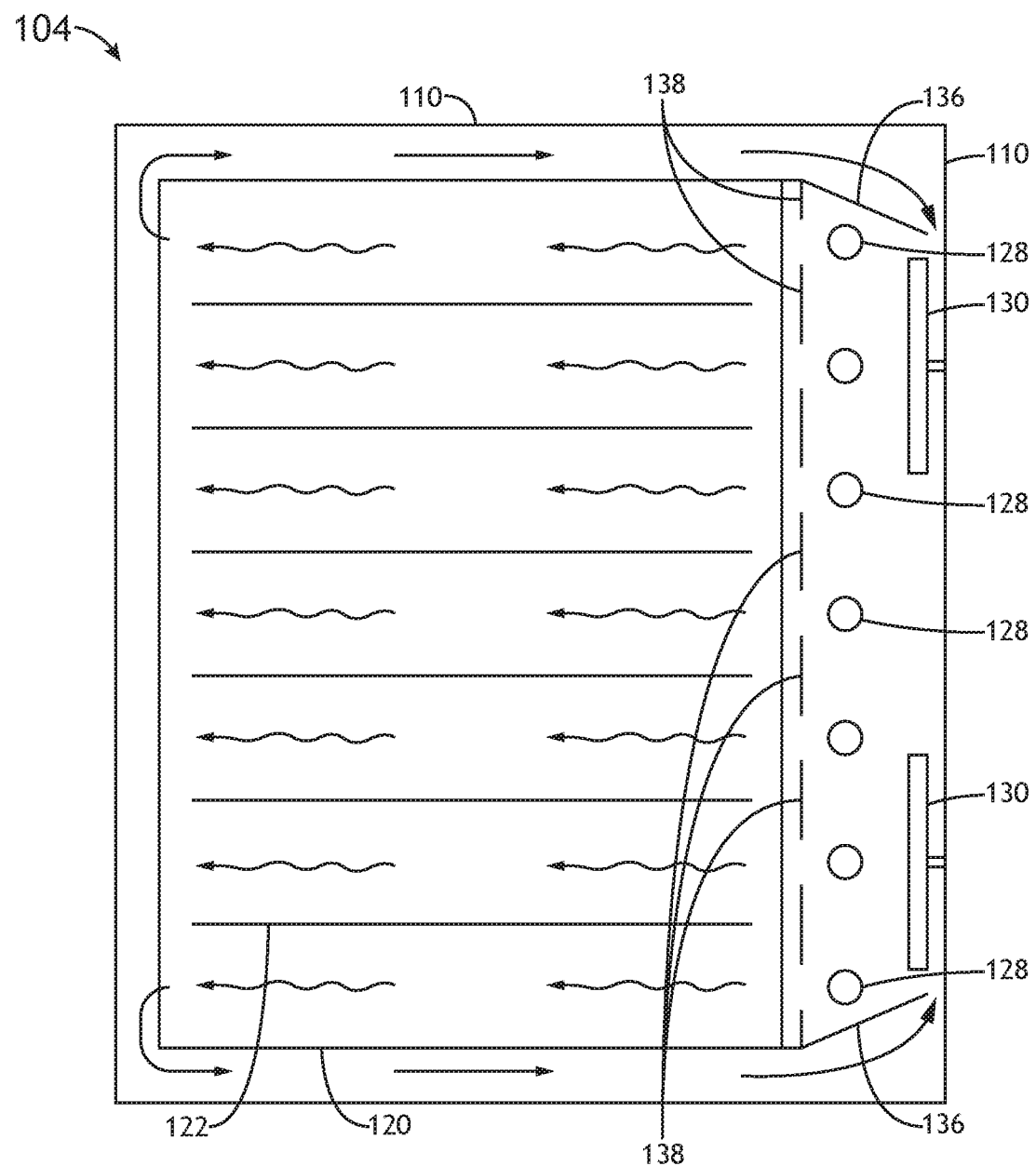
FIG. 4 is a side cross-sectional view of an exemplary oven of FIG. 1 according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an oven with improved airflow within an oven cavity. The improved airflow within the oven may reduce unevenness between temperatures of meals on meal trays.

Embodiments may include fans configured to blow air over heating elements so as to blow heated air first through a meal carrier and then suck the air between the meal carrier and inner oven walls back toward the fans. In embodiments, energy of the heated air may be first given to the meals on meal trays of the meal carrier, and then, relatively cooler return air is guided between the meal carrier and the inner oven walls toward the rear of the oven, where the fans and heating elements may be located. As such, in some embodiments, the heated air may impart more energy to the meals and less energy to the inner oven walls, as opposed to existing ovens where the heated air may first impart energy to the inner oven walls. Additionally, because the heated air imparts more energy to the meals and less energy to the inner oven walls, the oven may have the benefit of having a cooler temperature on the outer oven walls such that less insulation may be required between the inner oven walls and the outer oven walls or such that air conditioning costs can be reduced in a galley.

Embodiments may include one or more air deflectors and/or a baffle plate configured to direct the heated air evenly over the meals on the meal trays of the meal carrier.

In some embodiments, the fans of the oven may be radial fans, axial fans, tangential fans, or some combination thereof.

In some embodiments, the oven may include separate heating elements for every meal tray so that heat energy may be evenly distributed to the meal trays.

Referring now to FIG. 1, an exemplary embodiment of a system including a vehicle (e.g., an aircraft 100) is shown. The aircraft 100 may include one or more galleys 102 including one or more ovens 104. The oven 104 may be implemented as an oven insert. While the oven 104 is exemplarily depicted in the aircraft 100, the oven 104 may be implemented in any suitable environment.

Figure 5:
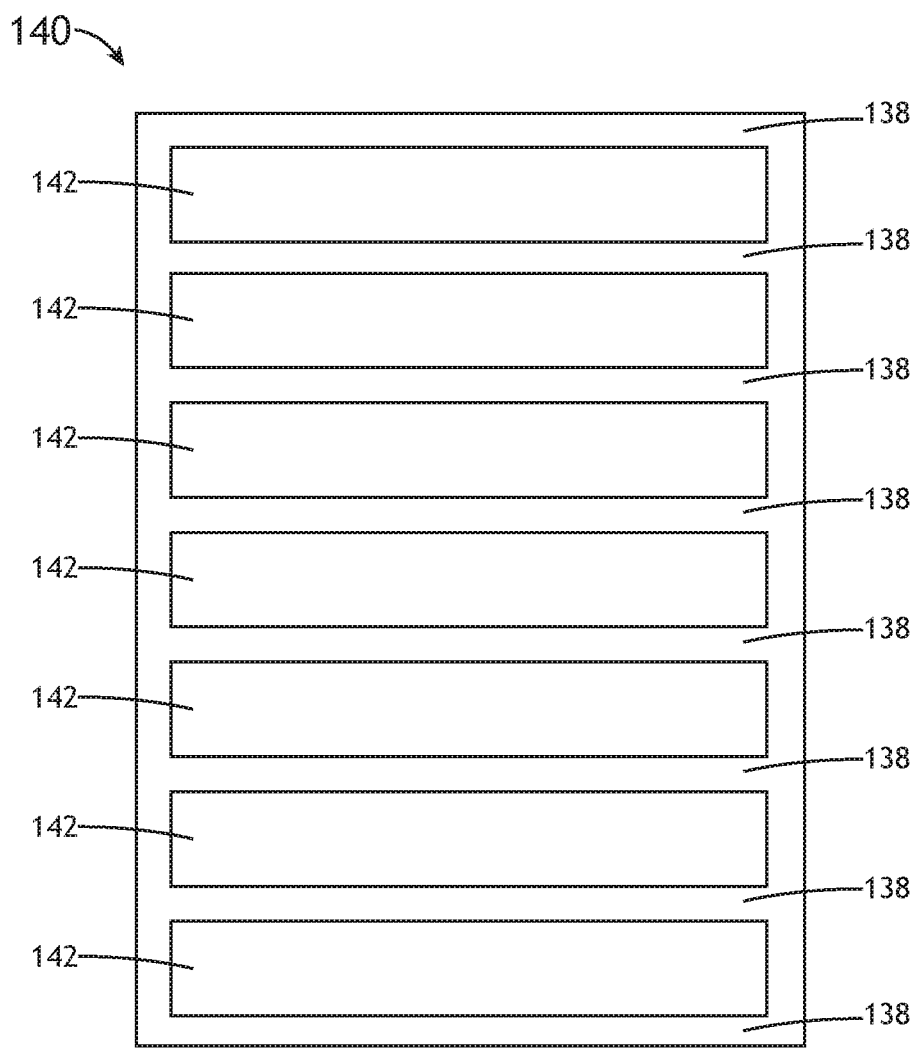
FIG. 5 is a view of a baffle plate of an exemplary oven of FIG. 1 according to the inventive concepts disclosed herein.
Figure 6:
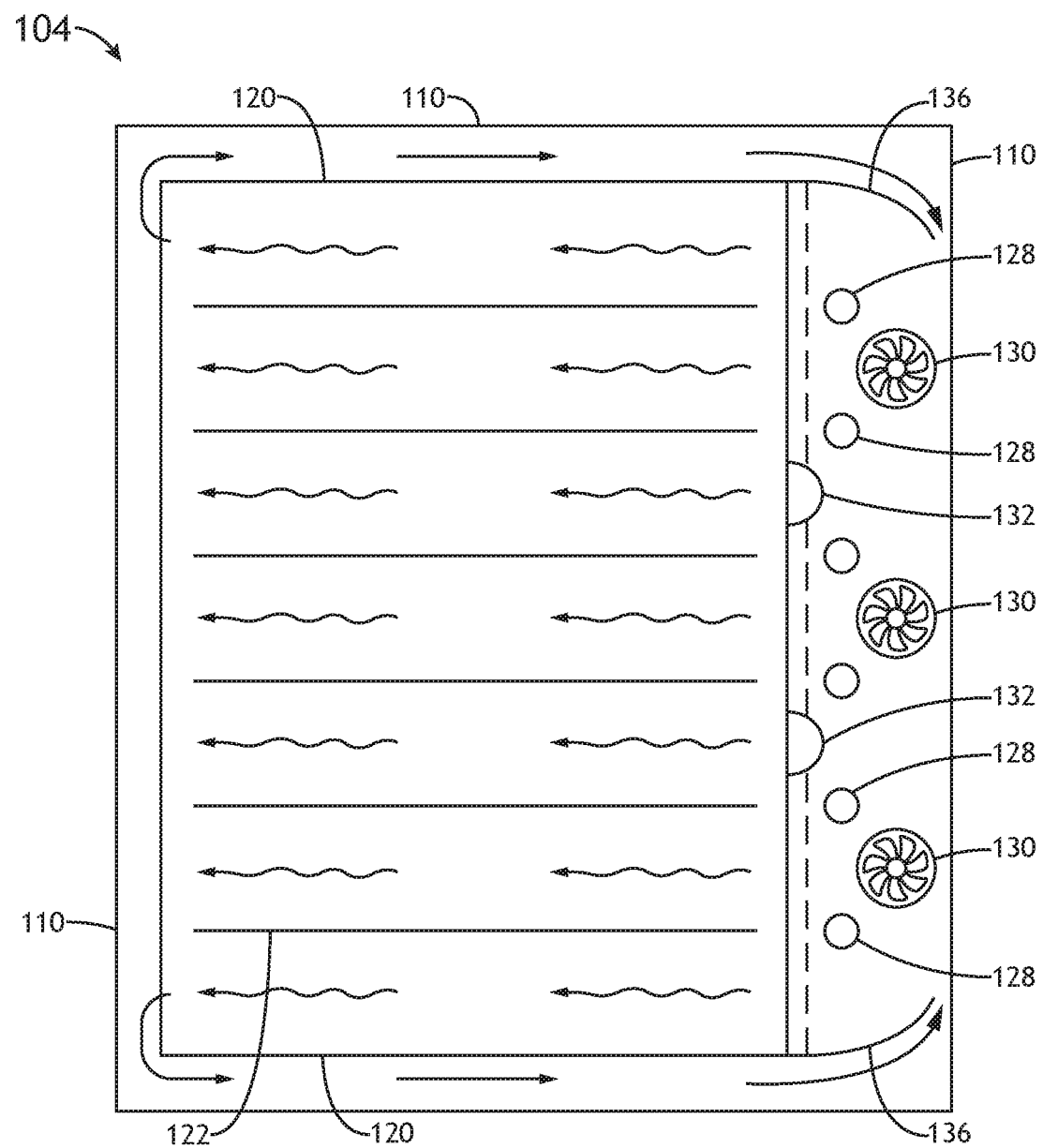
FIG. 6 is a side cross-sectional view of an exemplary oven of FIG. 1 according to the inventive concepts disclosed herein.
Figure 7:
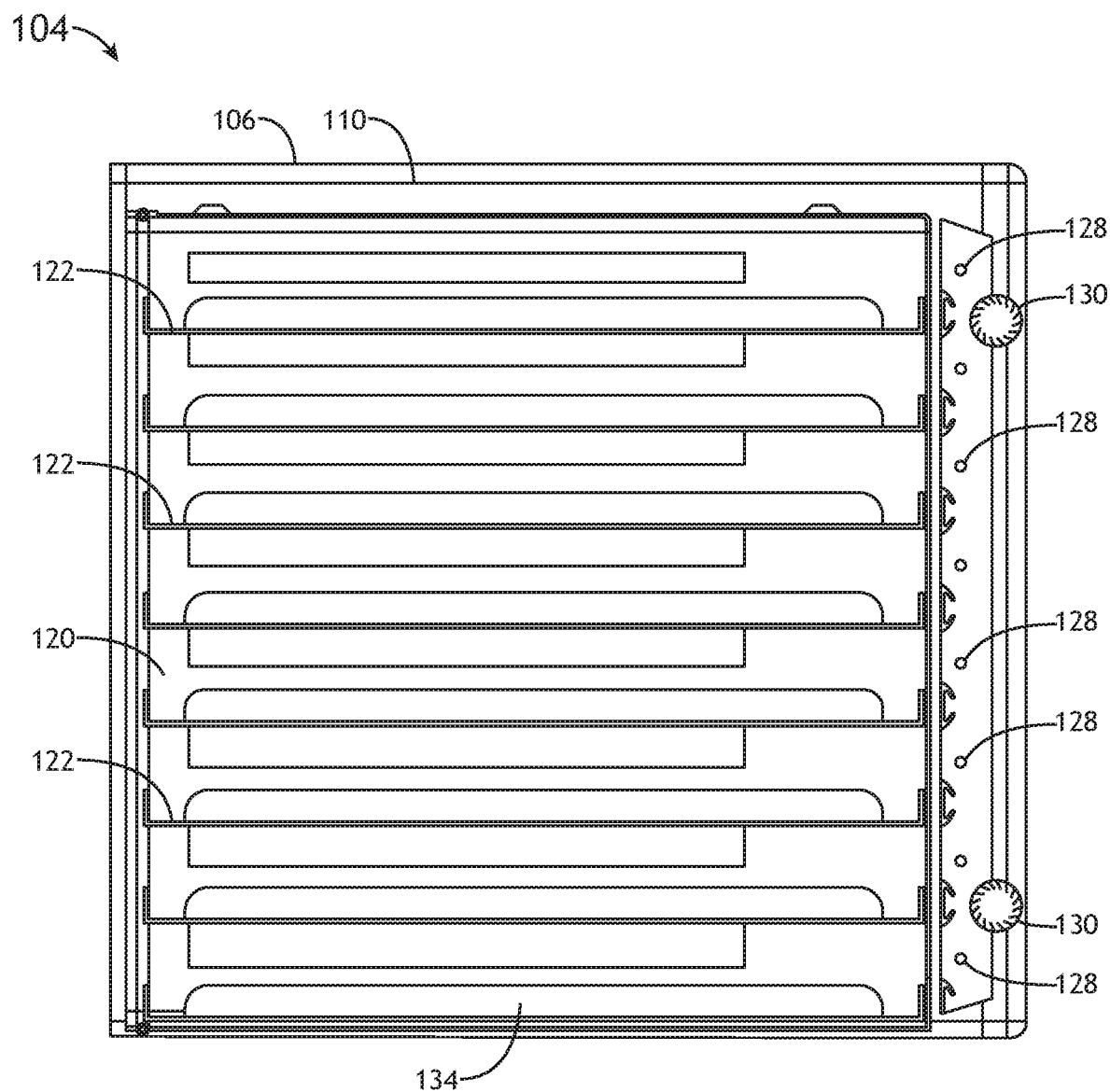
FIG. 7 is a side cross-sectional view of an exemplary oven of FIG. 1 having two horizontal tangential fans and separate heating elements according to the inventive concepts disclosed herein.
Figure 8:
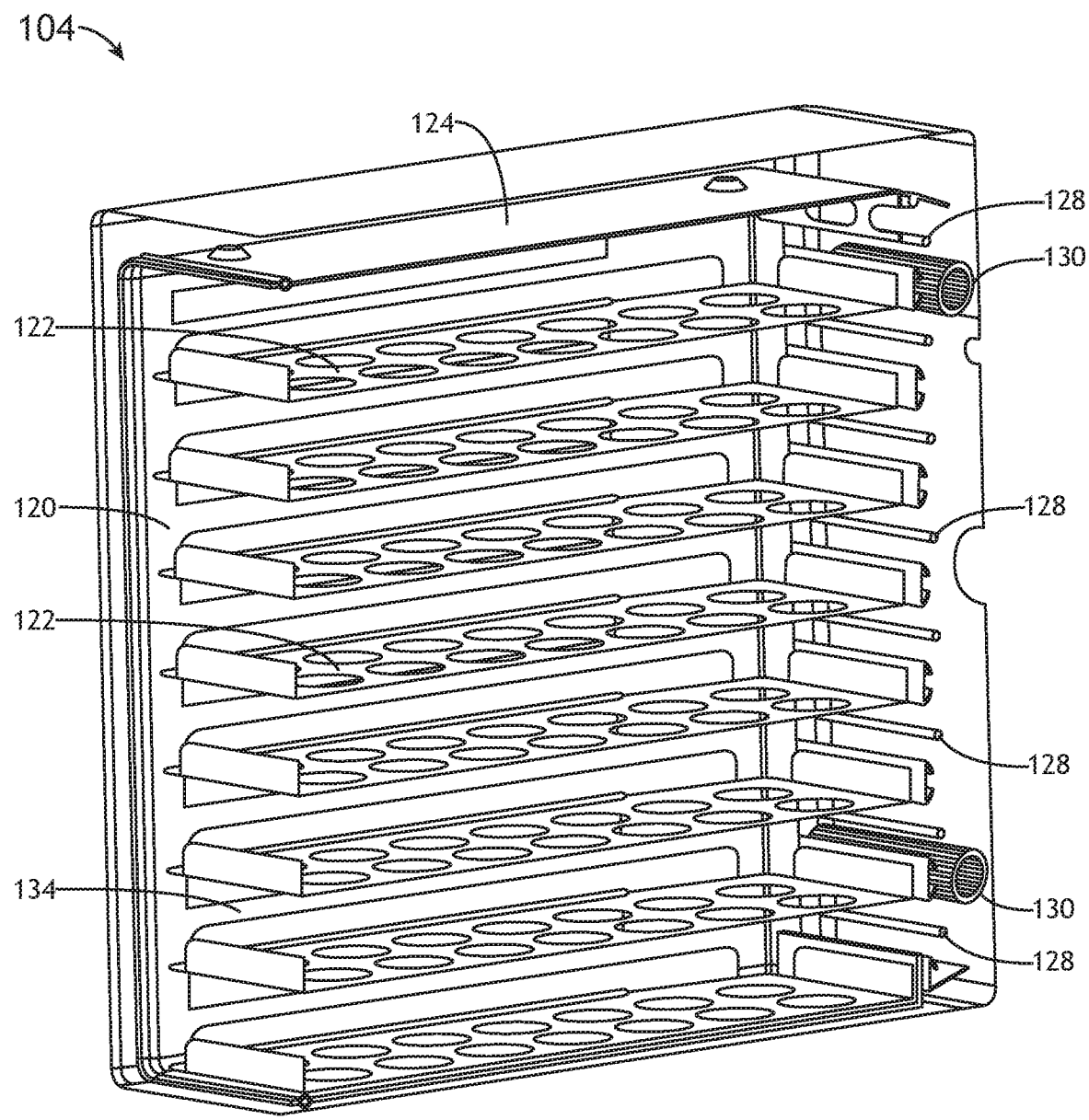
FIG. 8 is a perspective cross-sectional view of the oven of FIG. 7 according to the inventive concepts disclosed herein.
Figure 9:
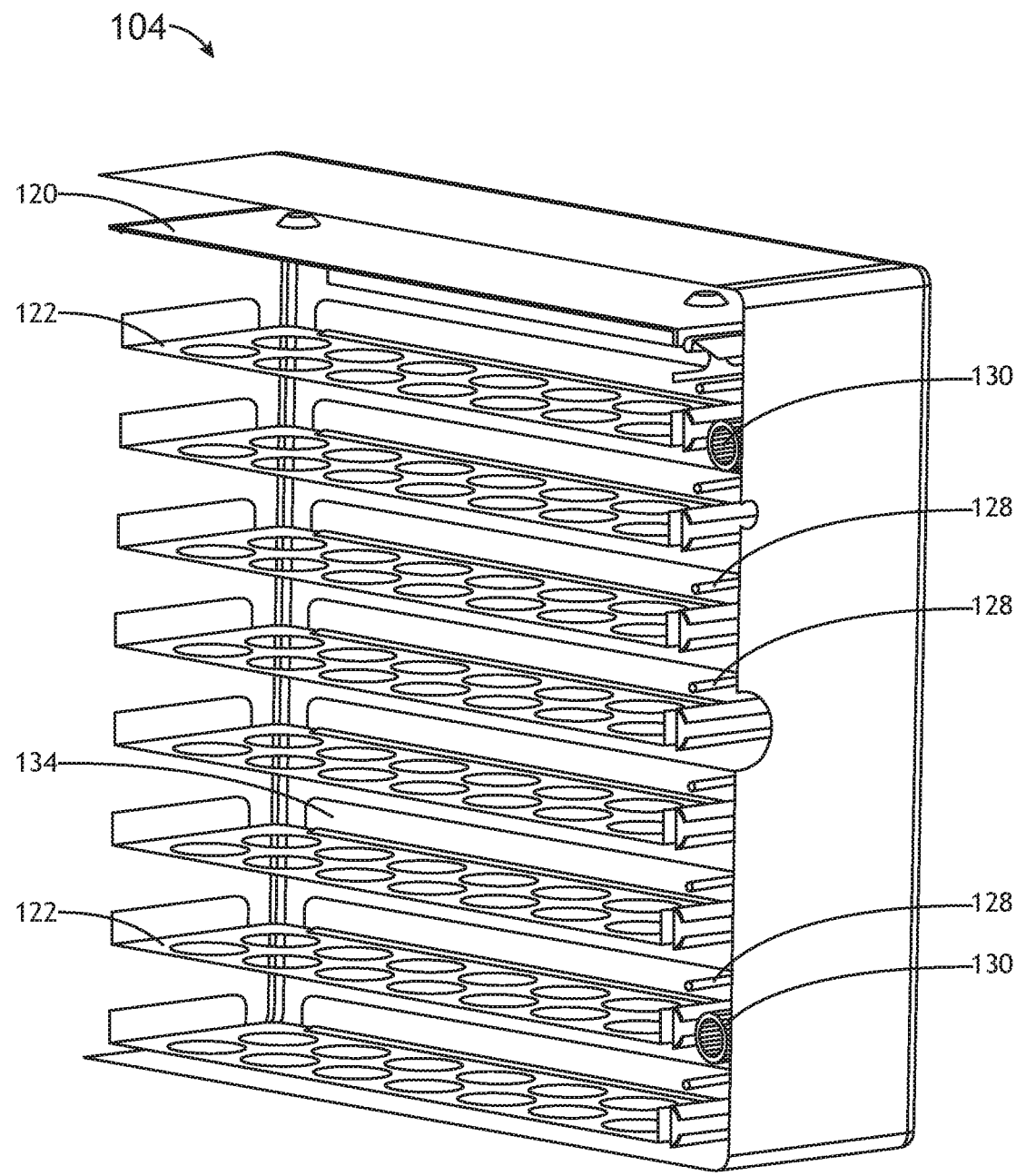
FIG. 9 is a perspective cross-sectional view of the oven of FIG. 7 according to the inventive concepts disclosed herein.
Figure 10:
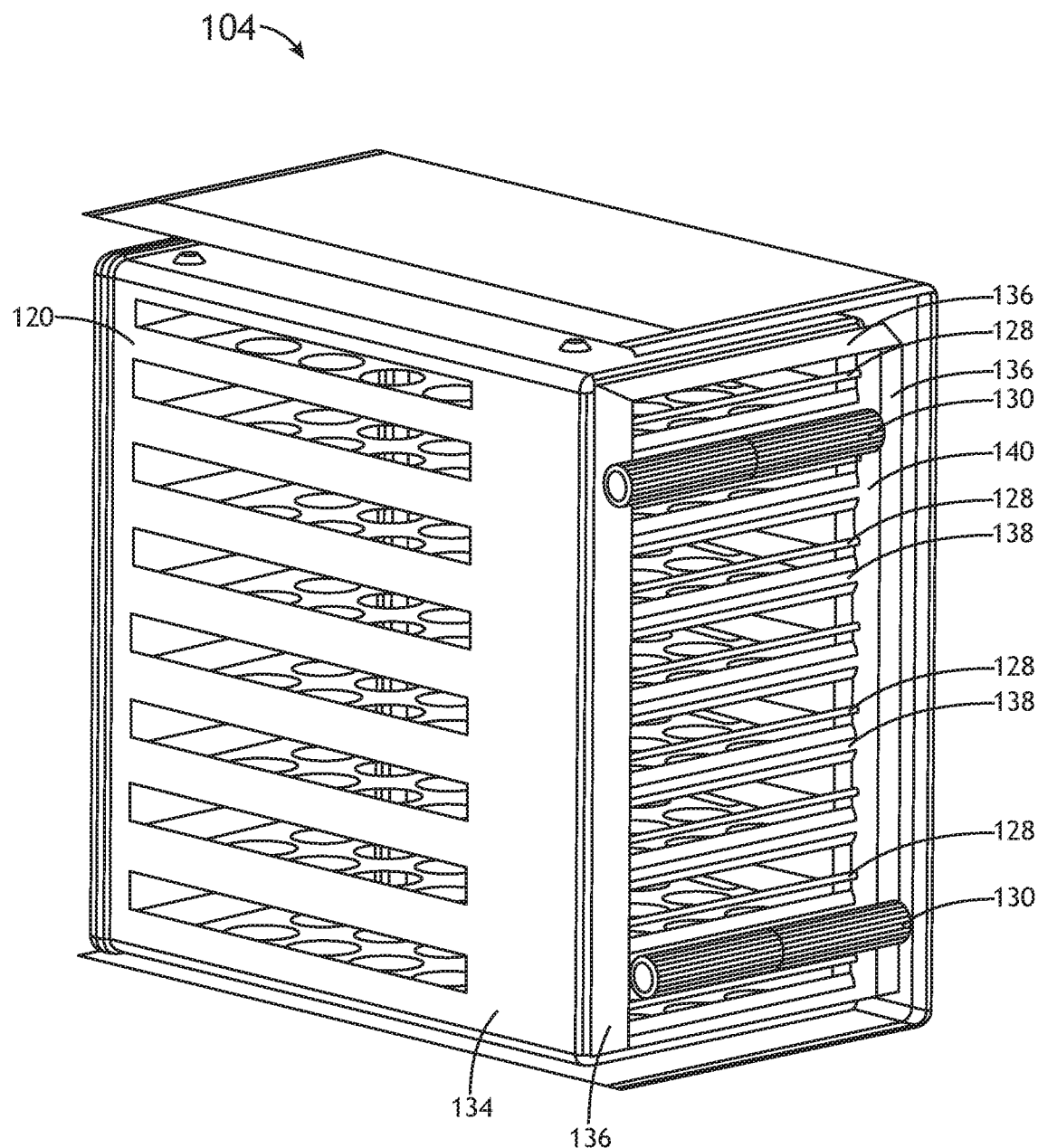
FIG. 10 is a perspective cross-sectional view of the oven of FIG. 7 according to the inventive concepts disclosed herein.

Referring now to FIGS. 2-6, exemplary embodiments of the oven 104 are shown. The oven 104 may include outer walls 106, insulation 108, inner walls 110, and a door 112 at the front of the oven 104. The oven 104 may have a front (e.g., near the door 112 of the oven 104), a bottom 114, a rear 116, a top 118, and two sides (not shown). The oven 104 may include a cavity contained within the inner walls 110 of the oven 104. A meal carrier 120 may be positioned within the cavity of the oven 104. The meal carrier 120 may include meal trays 122 configured to hold meals within the oven 104. The meal carrier 120 may have a top wall 124, a bottom wall 126, and two side walls 134 with openings at the front and rear of the meal carrier to allow heated air to be blown by at least one fan 130 over the meal trays 122. The oven 104 may include at least one heating element 128 located near the rear 116 of the oven between the meal carrier 120 and the at least one fan 130. The at least one fan 130 may be positioned near the rear 116 of the oven 104 between the inner walls 110 and the heating elements 128. The oven 104 may include one or more air deflectors (e.g., 132 and/or 136) and/or a baffle plate 140. As shown in FIG. 5, the baffle plate 140 may include baffles 138 and baffle plate openings 142. In some embodiments, the baffle plate 140 may be omitted and/or may be substituted with a mesh separating the at least one fan 130 and the at least one heating element 128 from the meal carrier 120 to prevent the meal carrier 120 from contacting the at least one fan 130 and/or the at least one heating element 128. The oven 104 may be configured to evenly distribute heated air over the meal trays 122. The meal carrier 120 may be positioned within the cavity of the oven 104. The meal carrier 120 may have a front and a rear corresponding to the front (e.g., near the door 112) and the rear 116 of the oven 104, respectively. The meal carrier 120 may include the top wall 124, the bottom wall 126, and the two side walls 134. The front and the rear of the meal carrier 120 may be open to allow a flow of air through the meal carrier 120 from the rear 116 of the oven to the front of the oven 104. The meal carrier 120 may include the meal trays 122 positioned generally parallel to the top wall 124 and the bottom wall 126 of the meal carrier 120. In some embodiments, the meal carrier 120 may be implemented as a drawer system (e.g., a fixed drawer system) with the meal trays 122.

The at least one heating element 128 may be configured to heat air in the oven 104. For example, the heating elements 128 may be positioned between the meal carrier 120 and the rear 116 of the oven 104. For example, each of the heating elements 128 may be positioned at a height between heights of two meal trays of the meal trays 122 or at a same height as a height of one of the meal trays 122. For example, each meal tray 122 may have a separate heating element 128.

The at least one fan 130 may be positioned between the rear 116 of the oven 104 and the heating elements 128. The at least one fan 130 may include any suitable number of fans, such as one, two, three, four, . . . six, . . . eight, etc. For example, the fans 130 may be arranged vertically and/or in an array of at least one (e.g., two or more) column of vertically arranged fans 130. The fans 130 may be configured to: draw air from the front of the oven 104 between the meal carrier 120 and the inner oven walls 110 to the rear 116 of the oven 104; blow the drawn air over the heating elements 128 to produce heated air; and distribute the heated air through the meal carrier 120 between meal trays of the meal trays 122. In some embodiments, the fans 130 may be implemented as axial fans, radial fans, tangential fans, or some combination thereof.

The oven 104 may include one or more types of air deflectors (e.g., 132 and/or 136) and/or a baffle plate 140.

For example, the oven 104 may include at least one first air deflector 132 positioned between the meal trays 122 and the heating elements 128. Each of the at least one first air deflector 132 may be configured to direct the heated air between two meal trays of the meal trays 122. Each of the at least one first air deflector may be positioned at a height between heights of two meal trays of the meal trays 122 or at a same height as a height of one of the meal trays 122. For example, the at least one first air deflector 132 may have any suitable shape, such as flat, curved, or V-shaped.

For example, the oven 104 may include at least two second air deflectors 136 configured to direct the air from the front of the oven 104 between the meal carrier 120 and the inner oven walls 110 to the rear 116 of the oven 104 while preventing the heated air from the fans 130 from blowing between the meal carrier 120 and the inner oven walls 110. One of the at least two second air deflectors 136 may extend, at least in part, from the top wall 124 of the meal carrier 120 toward the rear 116 of the oven 104. Another of the at least two second air deflectors 136 may extend, at least in part, from the bottom wall 126 of the meal carrier 120 toward the rear 116 of the oven 104. Additionally, for example, the at least two second air deflectors 136 may be implemented as four second air deflectors 136 with two second air deflectors extending, at least in part, from the side walls 134 of the meal carrier 120 toward the rear 116 of the oven 104. For example, the at least two second air deflectors 136 may be shaped (e.g., straight or curved) to direct air from the front of the oven 104 to between the fans 130 and the oven inner walls 110.

For example, the oven 104 may include a baffle plate 140 positioned between the meal trays 122 and the heating elements 128. The baffle plate 140 may include a plurality of baffles 138 and a plurality of baffle plate openings 142. The baffles 138 may be flat or curved. The baffle plate 140 may be configured to direct the heated air between meal trays of the meal trays 122.

Referring now to FIGS. 7-10, exemplary embodiments of the oven 104 are shown. The oven 104 of FIGS. 7-10 may be implemented similarly and function similarly as the embodiments of the oven 104 depicted in and described with respect to FIGS. 2-6, except that the oven 104 of FIGS. 7-10 may have at least two horizontal tangential fans 130 and separate heating elements 128.

Figure 11:
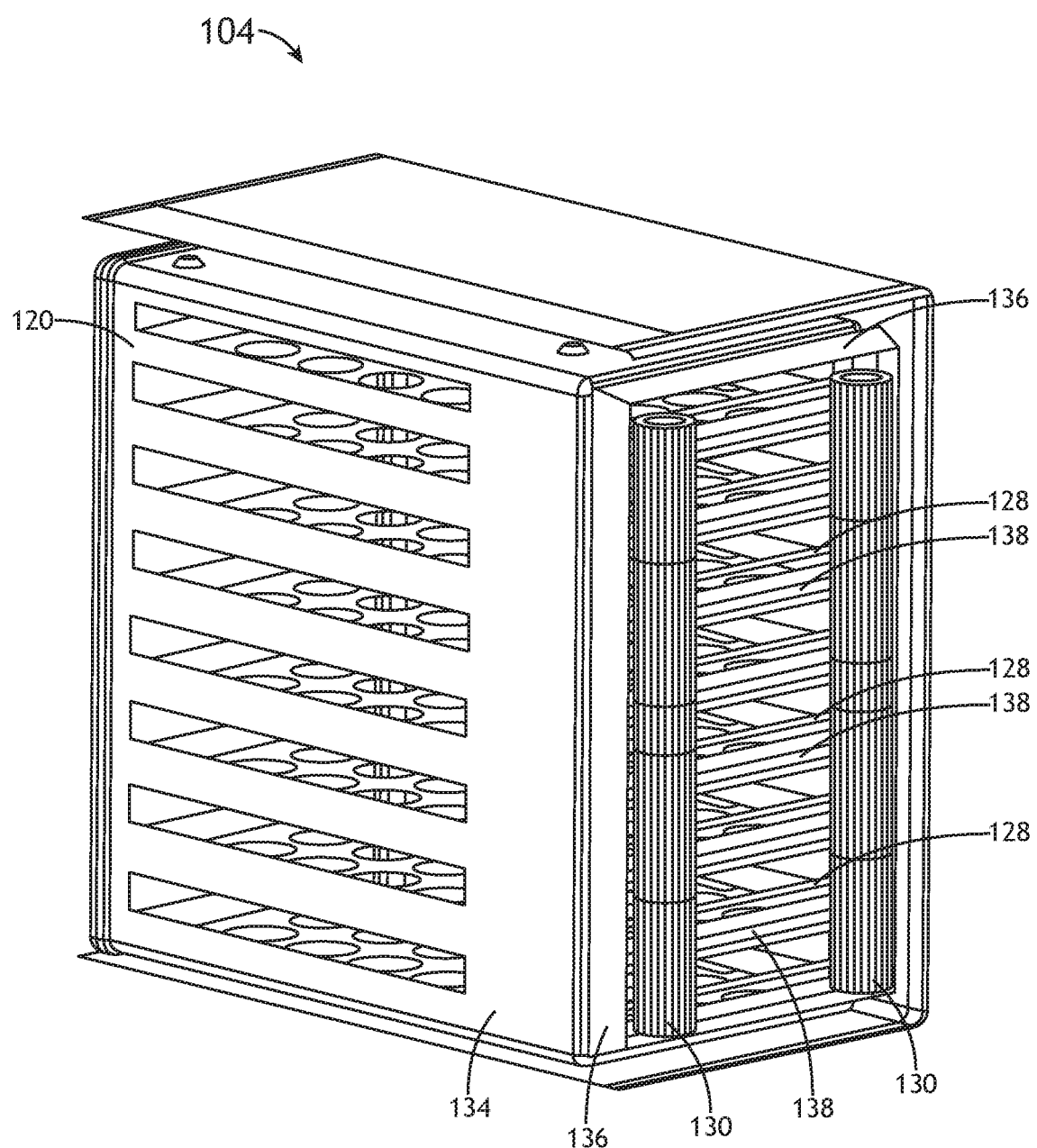
FIG. 11 is a perspective cross-sectional view of an exemplary oven of FIG. 1 having two vertical tangential fans and separate heating elements according to the inventive concepts disclosed herein.
Figure 12:
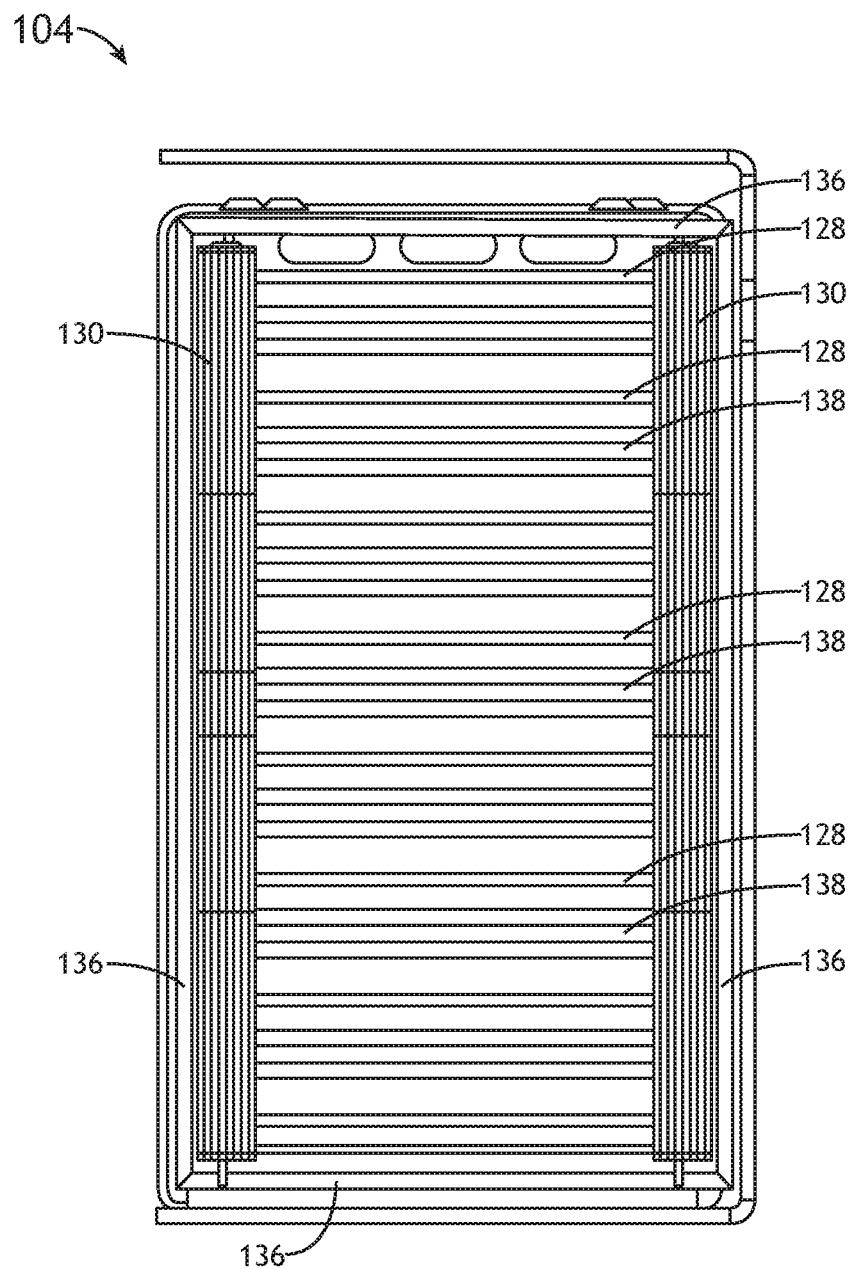
FIG. 12 is a rear cross-sectional view of the oven of FIG. 11 according to the inventive concepts disclosed herein.
Figure 13:
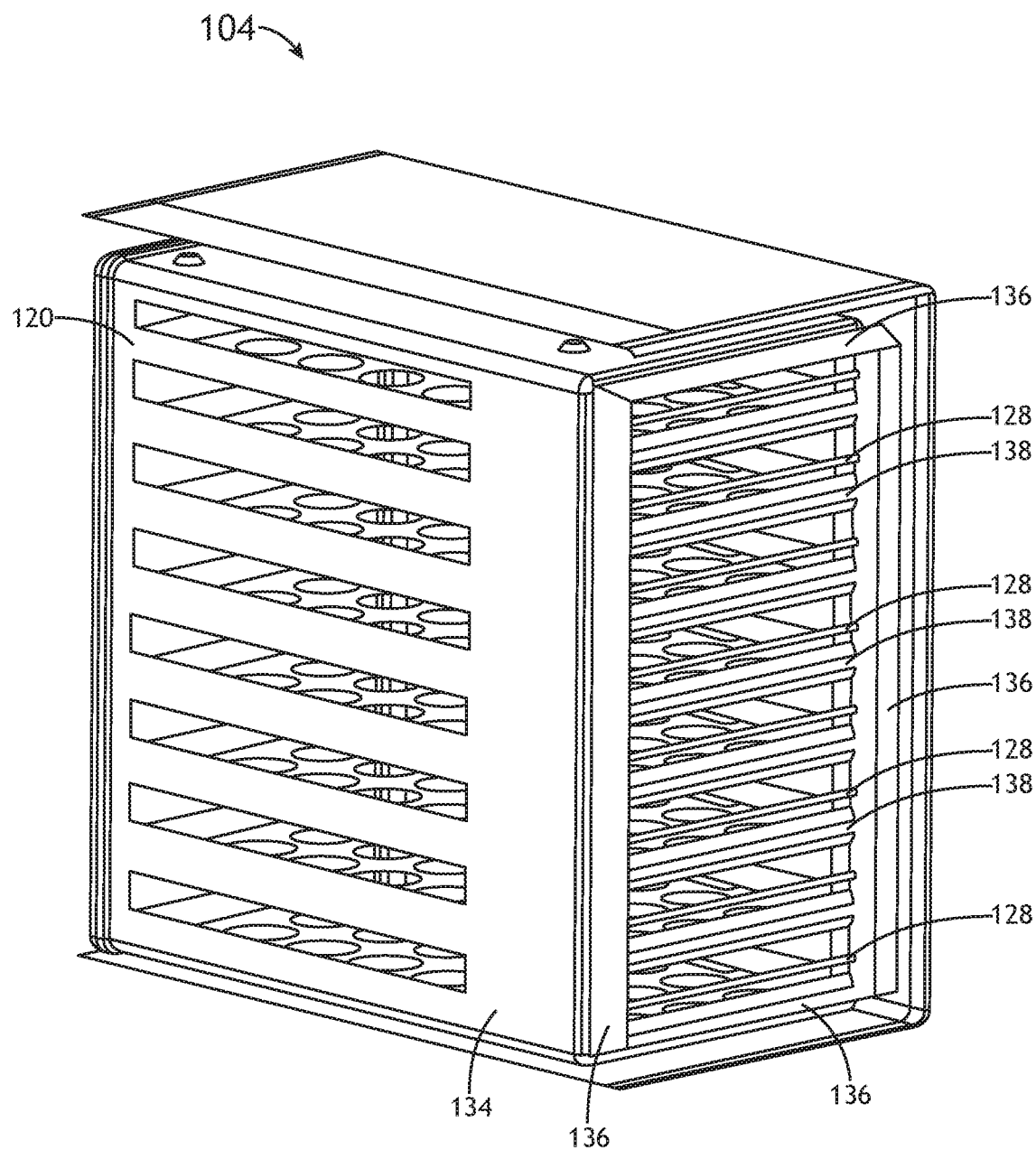
FIG. 13 is a perspective cross-sectional view of the oven of FIG. 11 according to the inventive concepts disclosed herein.

Referring now to FIGS. 11-13, exemplary embodiments of the oven 104 are shown. The oven 104 of FIGS. 11-13 may be implemented similarly and function similarly as the embodiments of the oven 104 depicted in and described with respect to FIGS. 2-6, except that the oven 104 of FIGS. 11-13 may have at least two vertical tangential fans 130 and separate heating elements 128.

Figure 14:
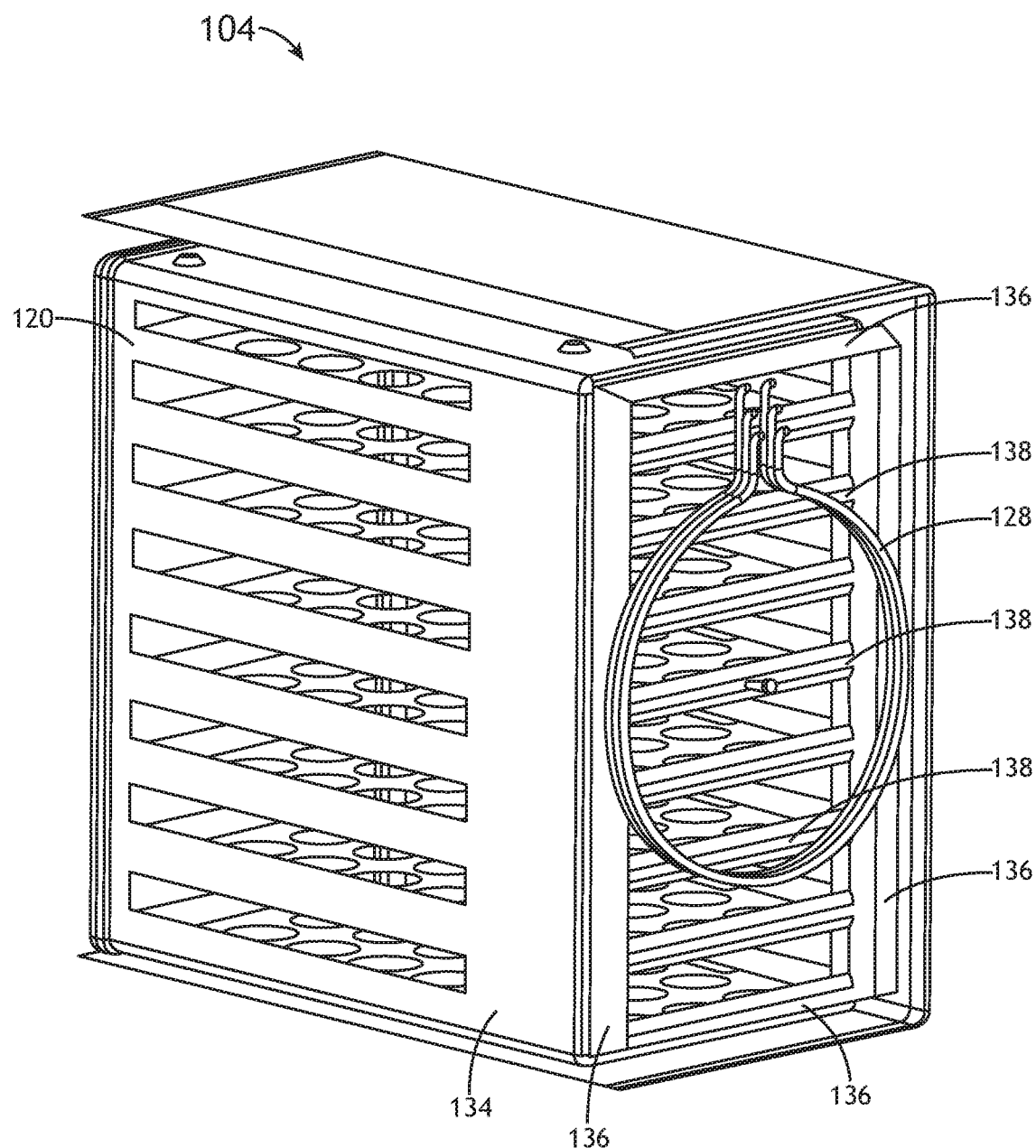
FIG. 14 is a perspective cross-sectional view of an exemplary oven of FIG. 1 having a central radial fan and a central heating element according to the inventive concepts disclosed herein.
Figure 15:
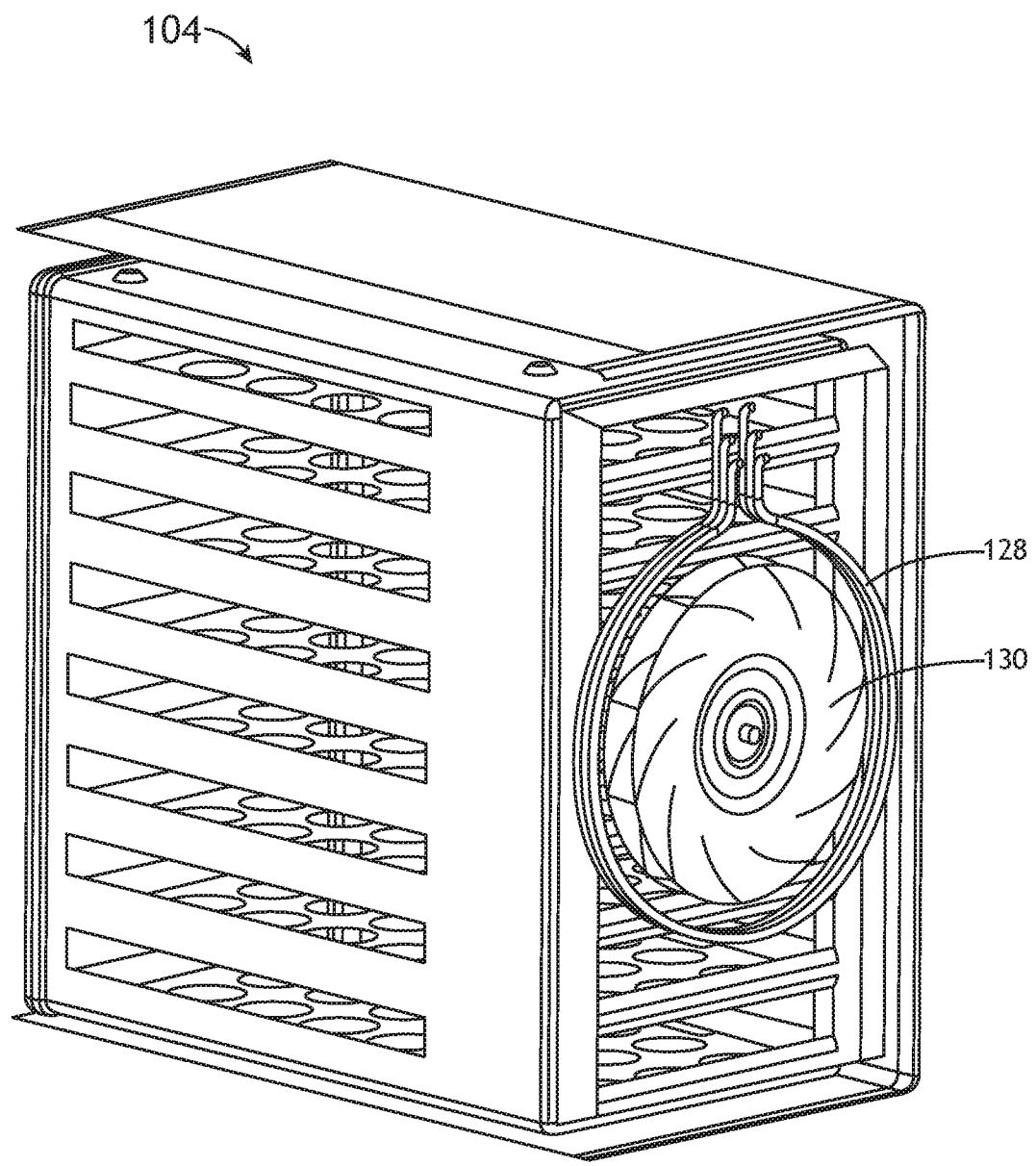
FIG. 15 is a perspective cross-sectional view of the oven of FIG. 14 according to the inventive concepts disclosed herein.
Figure 16:
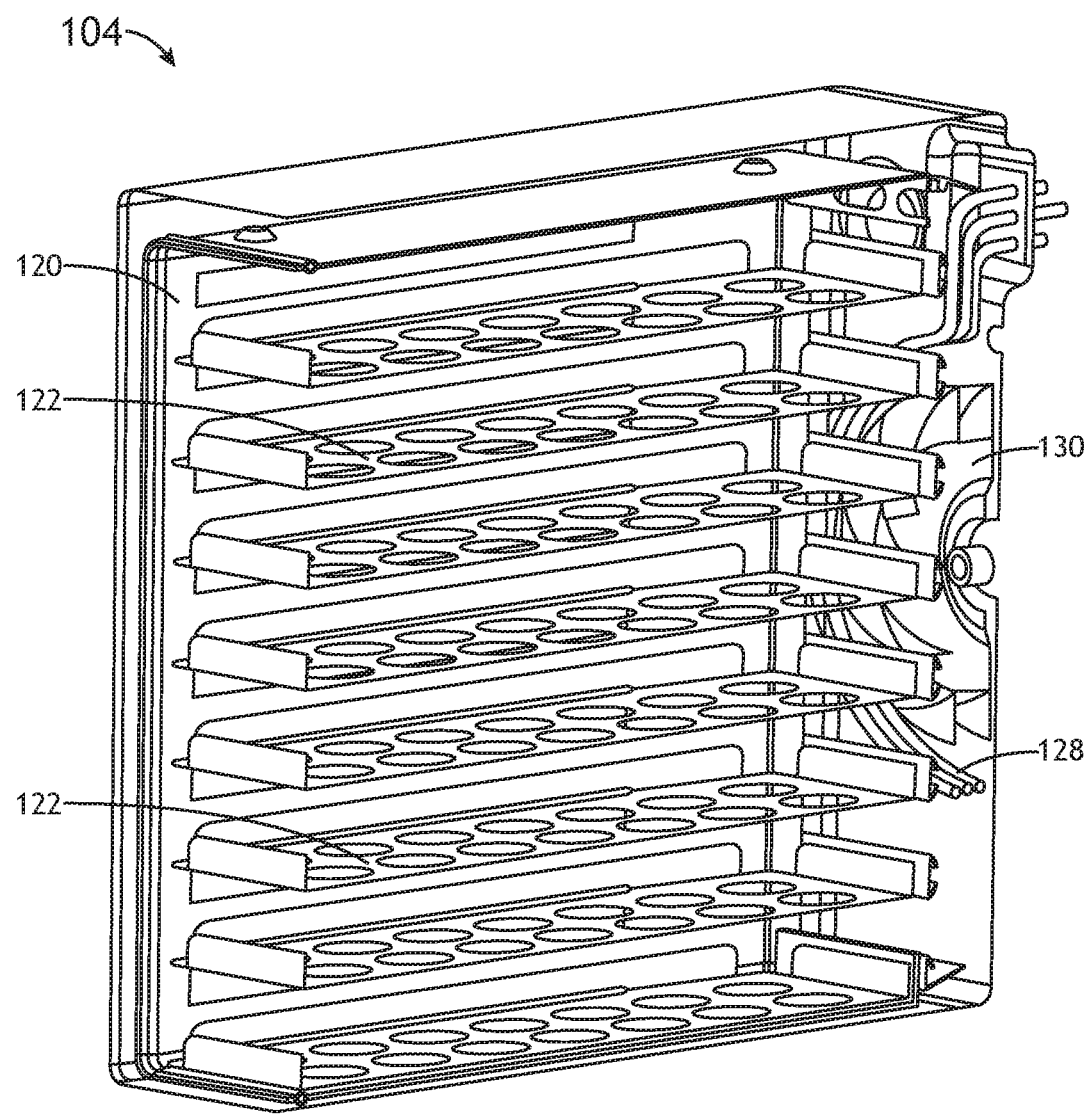
FIG. 16 is a perspective cross-sectional view of the oven of FIG. 14 according to the inventive concepts disclosed herein.

Referring now to FIGS. 14-16, exemplary embodiments of the oven 104 are shown. The oven 104 of FIGS. 14-16 may be implemented similarly and function similarly as the embodiments of the oven 104 depicted in and described with respect to FIGS. 2-6, except that the oven 104 of FIGS. 14-16 may have a central radial fan and a central heating element 128 implemented around the radial fan 130.

As will be appreciated from the above, embodiments of the inventive concepts disclosed herein may be directed to an oven and a system including an oven.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An oven, comprising:

inner oven walls defining a cavity within the oven, wherein the oven has a front and a rear;

a meal carrier positioned within the cavity of the oven, the meal carrier having a front and a rear corresponding to the front and the rear of the oven, respectively, the meal carrier including a top wall, two side walls, and a bottom wall, the front and the rear of the meal carrier being open to allow a flow of air through the meal carrier from the rear of the oven to the front of the oven, the meal carrier including a plurality of meal trays positioned generally parallel to the top wall and the bottom wall of the meal carrier;

at least one heating element configured to heat air in the oven, the at least one heating element positioned between the meal carrier and the rear of the oven; and at least one fan positioned between the rear of the oven and the at least one heating element, the at least one fan configured to:

draw air from the front of the oven between the meal carrier and the inner oven walls to the rear of the oven;

blow the drawn air over the at least one heating element to produce heated air; and distribute the heated air through the meal carrier between meal trays of the plurality of meal trays; and at least two air deflectors configured to direct the air from the front of the oven between the meal carrier and the inner oven walls to the rear of the oven while preventing the heated air from the at least one fan from blowing between the meal carrier and the inner oven walls, at least one air deflector positioned between the plurality of meal trays and the at least one heating element, each of the at least one air deflector configured to direct the heated air between two meal trays of the plurality of meal trays, wherein each of the at least one air deflector is positioned at a height between heights of two meal trays of the plurality of meal trays or at a same height as a height of one of the plurality of meal trays, wherein each of the at least one heating element is positioned at a height between heights of two meal trays of the plurality of meal trays or at a same height as a height of one of the plurality of meal trays, wherein the at least one fan comprises at least four fans arranged in an array of at least two columns of vertically arranged fans.

2. The oven of claim 1, wherein the at least two air deflectors are four air deflectors, wherein one of the four air deflectors extends, at least in part, from the top wall of the meal carrier toward the rear of the oven, wherein another of the four air deflectors extends, at least in part, from the bottom wall of the meal carrier toward the rear of the oven, wherein two of the four air deflectors extend, at least in part, from the two side walls of the meal carrier toward the rear of the oven.

3. The oven of claim 1, further comprising at least one first air deflector, the at least one first air deflector positioned between the plurality of meal trays and the at least one heating element, each of the at least one first air deflector configured to direct the heated air between two meal trays of the plurality of meal trays, the at least two air deflectors configured to direct the air from the front of the oven between the meal carrier and the inner oven walls to the rear of the oven while preventing the heated air from the at least one fan from blowing between the meal carrier and the inner oven walls.

4. The oven of claim 1, further comprising a baffle plate positioned between the meal trays and the at least one heating element, the baffle plate including a plurality of baffles and a plurality of openings, the baffle plate configured to direct the heated air between meal trays of the plurality of meal trays.

5. The oven of claim 1, wherein the oven is configured to evenly distribute heated air over the meal trays.

6. The oven of claim 1, wherein at least one of the at least one fan is a radial fan.

7. The oven of claim 1, wherein at least one of the at least one fan is an axial fan.

8. The oven of claim 1, wherein at least one of the at least one fan is a tangential fan.

9. The oven of claim 1, wherein the oven is an oven insert of an aircraft galley.

10. A system, comprising:

an oven, comprising:

inner oven walls defining a cavity within the oven, wherein the oven has a front and a rear;

at least one heating element configured to heat air in the oven; and at least one fan positioned between the rear of the oven and the at least one heating element, the at least one fan configured to:

draw air from the front of the oven to the rear of the oven;

blow the drawn air over the at least one heating element to produce heated air; and distribute the heated air within the oven; and at least two air deflectors configured to direct the air from the front of the oven between the meal carrier and the inner oven walls to the rear of the oven while preventing the heated air from the at least one fan from blowing between the meal carrier and the inner oven walls, at least one air deflector positioned between the plurality of meal trays and the at least one heating element, each of the at least one air deflector configured to direct the heated air between two meal trays of the plurality of meal trays, wherein each of the at least one air deflector is positioned at a height between heights of two meal trays of the plurality of meal trays or at a same height as a height of one of the plurality of meal trays, wherein each of the at least one heating element is positioned at a height between heights of two meal trays of the plurality of meal trays or at a same height as a height of one of the plurality of meal trays, wherein the at least one fan comprises at least four fans arranged in an array of at least two columns of vertically arranged fans.

11. The system of claim 10, wherein the oven is implemented in an aircraft galley.

12. An aircraft galley, comprising:

an oven insert, comprising:

inner oven walls defining a cavity within the oven insert, wherein the oven insert has a front and a rear;

a meal carrier positioned within the cavity of the oven insert, the meal carrier having a front and a rear corresponding to the front and the rear of the oven insert, respectively, the meal carrier including a top wall, two side walls, and a bottom wall, the front and the rear of the meal carrier being open to allow a flow of air through the meal carrier from the rear of the oven insert to the front of the oven insert, the meal carrier including a plurality of meal trays positioned generally parallel to the top wall and the bottom wall of the meal carrier;

at least one heating element configured to heat air in the oven insert, the at least one heating element positioned between the meal carrier and the rear of the oven insert; and at least one fan positioned between the rear of the oven insert and the at least one heating element, the at least one fan configured to:
- draw air from the front of the oven insert between the meal carrier and the inner oven walls to the rear of the oven insert;
- blow the drawn air over the at least one heating element to produce heated air; and
- distribute the heated air through the meal carrier between meal trays of the plurality of meal trays; and at least two air deflectors configured to direct the air from the front of the oven between the meal carrier and the inner oven walls to the rear of the oven while preventing the heated air from the at least one fan from blowing between the meal carrier and the inner oven walls, at least one air deflector positioned between the plurality of meal trays and the at least one heating element, each of the at least one air deflector configured to direct the heated air between two meal trays of the plurality of meal trays, wherein each of the at least one air deflector is positioned at a height between heights of two meal trays of the plurality of meal trays or at a same height as a height of one of the plurality of meal trays, wherein each of the at least one heating element is positioned at a height between heights of two meal trays of the plurality of meal trays or at a same height as a height of one of the plurality of meal trays, wherein the at least one fan comprises at least four fans arranged in an array of at least two columns of vertically arranged fans.

* * * * *